(12) United States Patent
Utagawa (10) Patent No.: US 7,922,332 B2
(45) Date of Patent: Apr. 12, 2011

(54) COMPENSATION ELEMENT ADJUSTMENT MECHANISM AND PROJECTOR

(75) Inventor: Takeshi Utagawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 386 days.

(21) Appl. No.: 12/186,696

(22) Filed: Aug. 6, 2008

(65) Prior Publication Data

US 2009/0040464 A1 Feb. 12, 2009

Related U.S. Application Data

(60) Provisional application No. 61/055,657, filed on May 23, 2008.

(30) Foreign Application Priority Data

Aug. 6, 2007 (JP) .................................. 2007-203868

(51) Int. Cl.
*G03B 21/14* (2006.01)
(52) U.S. Cl. ........................................................ 353/20
(58) Field of Classification Search .................... 353/20; 349/117, 119; 348/E9.027
See application file for complete search history.

(56) References Cited

U.S. PATENT DOCUMENTS

| 6,854,848 B2 | 2/2005 | Fujimori et al. |
| 6,935,745 B1 | 8/2005 | Kitabayashi et al. |
| 2005/0105054 A1* | 5/2005 | Arai et al. ........................ 353/20 |
| 2007/0064198 A1* | 3/2007 | Yoshimura ....................... 353/20 |

FOREIGN PATENT DOCUMENTS

| JP | 57-079810 U | 5/1982 |
| JP | 62-238089 A | 10/1987 |
| JP | 03-022203 U | 3/1991 |
| JP | 09-197234 A | 7/1997 |
| JP | 2002182213 A * | 6/2002 |
| JP | 2003-121931 A | 4/2003 |
| JP | 06-022805 Y | 1/2006 |
| JP | 2006-243643 | 9/2006 |
| JP | 2007-078735 | 3/2007 |

* cited by examiner

*Primary Examiner* — Thanh X Luu
(74) *Attorney, Agent, or Firm* — AdvantEdge Law Group, LLC (57) ABSTRACT

A compensation element adjustment mechanism used with a light modulation device and a polarization plate includes: an optical compensation element disposed between the light modulation device and a polarization plate; a frame for supporting the optical compensation element, and having a pair of shaft members disposed at positions opposed to each other on a periphery of the optical compensation element; a support holder to be fixed with respect to the light modulation device, and for rotatably supporting the pair of shaft members; and a fixing section for restricting a displacement of the frame to the support holder by an elastic contact.

14 Claims, 10 Drawing Sheets

COMPENSATION ELEMENT ADJUSTMENT MECHANISM AND PROJECTOR

BACKGROUND

1. Technical Field

The present invention relates to a compensation element adjustment mechanism for optical compensation of a light modulation device, and a projector having such a compensation element adjustment mechanism incorporated therein.

2. Related Art

An optical compensation sheet is disposed on an entrance side or an emission side of a liquid crystal panel in an optical device for image light formation incorporated in a projector, and in order for adjusting the mounting posture of the optical compensation sheet, there is used a holder capable of rotating the optical compensation sheet around the optical axis or making the optical compensation sheet turn around the rotational axis perpendicular to the optical axis (see JP-A-2007-78735 (Patent Document 1)). In the case, for example, in which the optical compensation sheet is made turn around the rotational axis perpendicular to the optical axis together with a frame member, a pair of shaft members provided to the frame member is pivotally supported by a pair of pivotally supporting sections provided to a fixing member as protrusions, and the frame member is fixed to the fixing member with a screw after the adjustment.

However, in the holder described above, it is difficult to perform a fine adjustment of the mounting posture of the optical compensation sheet. Specifically, an operation of fixing the posture of the frame member with a screw is absolutely necessary after adjusting the posture of the frame member, and the posture of the frame member can easily be changed again when fixing it with a screw after the adjustment of the frame member, thus the precise adjustment of the mounting posture of the optical compensation sheet and the fixation thereafter are difficult.

SUMMARY

An advantage of some aspects of the invention is to provide a compensation element adjustment mechanism with which the fine adjustment of the mounting posture of the optical compensation element can easily be performed, and a projector having such a compensation element adjustment mechanism incorporated therein.

A compensation element adjustment mechanism according to an aspect of the invention includes (a) an optical compensation element disposed between a light modulation device and a polarization plate, (b) a frame for supporting the optical compensation element, and having a pair of shaft members disposed at positions opposed to each other on a periphery of the optical compensation element, (c) a support holder fixed to a side of the light modulation device, and for rotatably supporting the pair of shaft members of the frame, and (d) a fixing section for restricting a displacement of the frame to the support holder by an elastic contact.

In the compensation element adjustment mechanism described above, since the frame supporting the optical compensation element has a pair of shaft members disposed at positions opposed to each other in the periphery of the optical compensation element, the mounting posture of the frame, namely of the optical compensation element can be adjusted with respect to the light modulation device or the like. On this occasion, since the fixing section restricts the displacement of the frame with respect to the support holder with an elastic contact, the posture of the optical compensation element can be changed as much as a desired amount together with the frame, and held as it stands, thus the precise adjustment of the mounting posture of the optical compensation element and the simple fixing thereof after the adjustment become possible.

Further, according to a specific aspect or a view point of the invention, in the compensation element adjustment mechanism described above, a fine adjustment of the displacement of the frame with respect to the support holder is allowed by the fixing section stopping the frame with friction force. In this case, the posture of the optical compensation element is fixed by the friction force in the condition in which the posture thereof has been fine-adjusted against the friction force.

According to another aspect of the invention, the fixing section includes a first member attached to the support holder and a second member extending from the frame, and restricts the displacement of the frame to the support holder by an elastic contact between the first and second members. In this case, simple fixation of the mounting posture of the optical compensation element becomes possible by interposition of the first member.

According to still another aspect of the invention, an operating knob capable of adjusting the posture of the frame is provided by extending the second member outside the support holder. In this case, simple posture adjustment of the frame, namely the optical compensation element becomes possible by using the operating knob.

According to still another aspect of the invention, the fixing section includes a resin spring or a metal plate spring provided to the first or the second member. In this case, fixation or restriction of displacement of the frame becomes possible with a simple mechanism.

According to still another aspect of the invention, a pair of shaft members is disposed in a direction tilted from the vertical direction or the horizontal direction of the screen of the light modulation device. In this case, the optical compensation element can be rotated around an axis tilted with respect to the field angle and tilted.

According to still another aspect of the invention, the pair of shaft members is rod-like members or elongated members respectively supported by a pair of slit-like notches provided to the support holder. In this case, simple support and smooth posture adjustment of the frame, namely the optical compensation element becomes possible.

According to still another aspect of the invention, the support holder has a first junction section on one side to be bonded with the light modulation device, a second junction section on the other side to which the polarization plate is attached, and a gap-like space for housing the frame between the first and second junction sections. In this case, the light modulation device and the polarization plate can integrally be fixed by the support holder, thus the posture of the optical compensation element can be adjusted among these components.

According to still another aspect of the invention, the polarization plate is disposed on the emission side of the light modulation device, and the support holder includes a fixing metal plate disposed on the emission side of the polarization plate. In this case, the compensation element adjustment mechanism can be fixed to the member on the emission side such as a prism via the fixing metal plate.

A projector according to still another aspect of the invention includes (a) the compensation element adjustment mechanism for each of colors, (b) a light modulation device for each of colors, (c) an illumination device for illuminating the light modulating devices of the respective colors, (d) a light combining device for combining the light emitted from the light modulating devices of the respective colors, and (e) a projection optical system for projecting the light combined through the light combining device.

In the projector described above, the illumination light of the respective colors enters the light modulation device of the respective colors to be modulated by the light modulation device of the respective colors into the light beams of the respective colors, and then the light beams of the respective colors are combined by the light combining member, and the combined light beam is projected on the screen as an image via the projection optical system. On this occasion, since the compensation element adjustment mechanism according to the aspects of the invention with a simple structure as described above is used, the optical compensation element can precisely be arranged with a simple structure, thus the contrast in image display can easily be improved.

BRIEF DESCRIPTION OF THE DRAWINGS

The invention will be described with reference to the accompanying drawings, wherein like numbers reference like elements.

FIG. 5 is an exploded perspective view of the emission filter unit and so on.

DESCRIPTION OF EXEMPLARY EMBODIMENTS

First Embodiment

Figure 1:
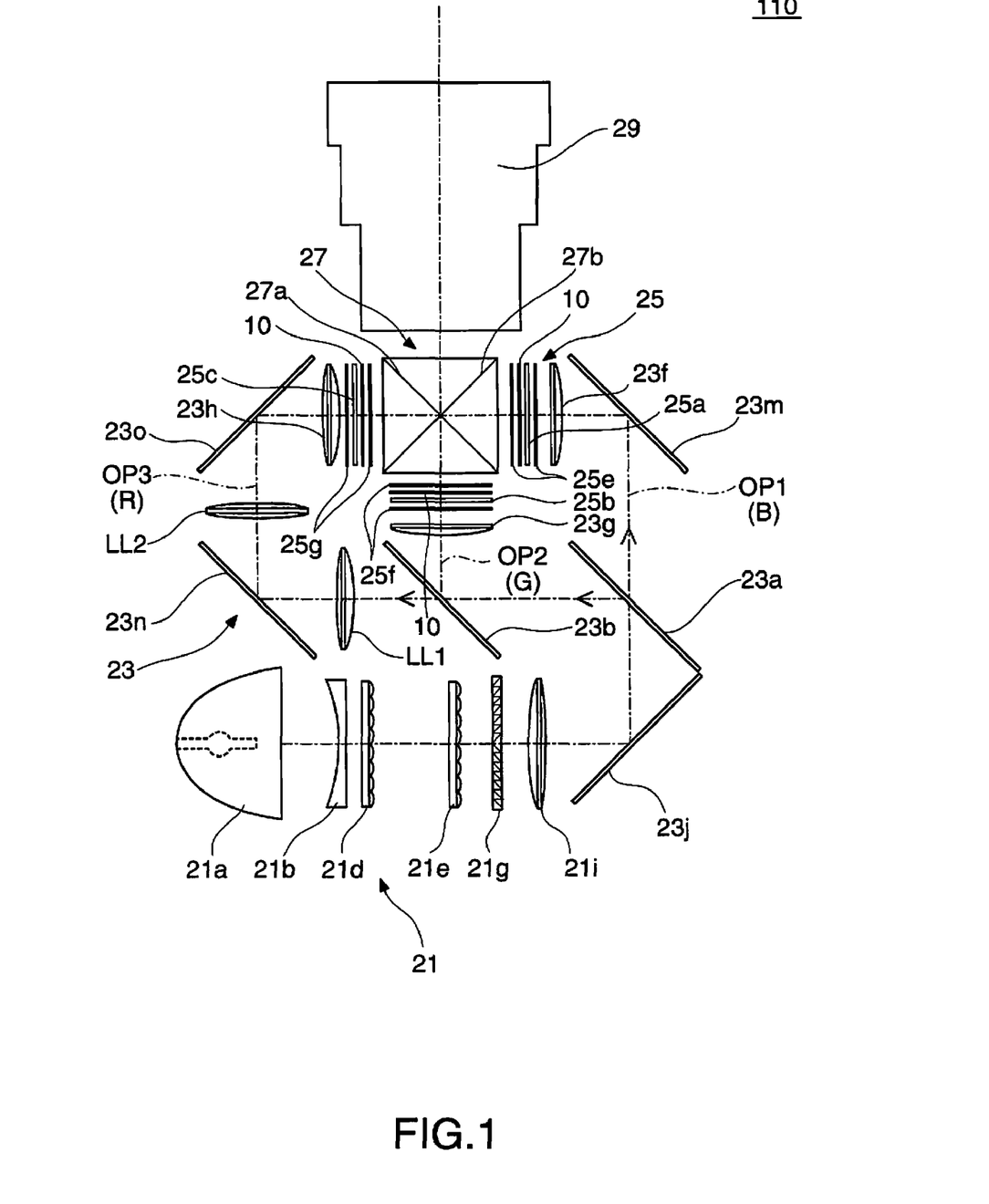
FIG. 1 is a plan view for explaining the structure of the projector according to the first embodiment.

FIG. 1 is a diagram for explaining a structure of a projector according to a first embodiment of the invention. The present projector 110 is provided with a light source device 21 for generating source light, a color separation optical system 23 for separating the source light from the light source device 21 into three colors of light, red, green, and yellow, a light modulation section 25 illuminated by the illumination light of respective colors emitted from the color separation optical system 23, a cross dichroic prism 27 for combining image light of respective colors from the light modulation section 25, and a projection lens 29 as a projection optical system for projecting the image light passing through the cross dichroic prism 27 on a screen (not shown).

In the projector 110 described above, the light source 21 is provided with a light source lamp 21a, a concave lens 21b, a pair of fly-eye lenses 21d, 21e, a polarization conversion member 21g, and an overlapping lens 21i. In these components, the light source lamp 21a is formed, for example, of a high pressure mercury lamp, and is equipped with a concave mirror for collecting the source light to emit it forward. The concave lens 21b, which has a role of collimating the source light from the light source lamp 21a, can also be eliminated. The pair of fly-eye lenses 21d, 21e is each composed of a plurality of element lenses arranged in a matrix, and divides the source light from the light source lamp 21a passing through the concave lens 21b with these element lenses to be individually collected or diffused. The polarization conversion member 21g converts the source light emitted from the fly-eye lens 21e into, for example, the light with only the S-polarized component perpendicular to the sheet of FIG. 1, and supplies it to the subsequent optical system. The overlapping lens 21i appropriately collects the illumination light passing through the polarization conversion member 21g as a whole, thereby making it possible to illuminate in an overlapping manner the light modulation devices of respective colors provided to the light modulation section 25. Specifically, the illumination light passing through the both fly-eye lenses 21d, 21e and the overlapping lens 21i evenly illuminates in an overlapping manner the liquid crystal panels 25a, 25b, and 25c of respective colors disposed in the light modulation section 25 after passing through the color separation optical system 23 described below in detail.

The color separation optical system 23 is provided with first and second dichroic mirrors 23a, 23b, three field lenses 23f, 23g, and 23h as the correction optical system, and reflecting mirrors 23j, 23m, 23n, and 23o, and forms the illumination device together with the light source device 21. Here, the first dichroic mirror 23a reflects, for example, red light and green light, and transmits blue light in the three colors of light of red, green, and blue. Further, the second dichroic mirror 23b reflects, for example, the green light and transmits the red light in the two colors of light of red and green input therein. In the color separation optical system 23, the substantially white source light from the light source device 21 enters the first dichroic mirror 23a with the light path folded by the reflecting mirror 23j. The blue light passing through the first dichroic mirror 23a enters the field lens 23f via the reflecting mirror 23m while staying as, for example, S-polarized light. Further, the green light reflected by the first dichroic mirror 23a, and further reflected by the second dichroic mirror 23b enters the field lens 23g while staying as, for example, S-polarized light. Further, the red light passing through the second dichroic mirror 23b enters the field lens 23h for adjusting the entrance angle via the lenses LL1, LL2, and the reflecting mirrors 23n, 23o while staying as, for example, S-polarized light. The lenses LL1, LL2 and the field lens 23h form a relay optical system. The relay optical system has a function of almost directly transmitting the image in the first lens LL1 to the field lens 23h via the second lens LL2.

The light modulation section 25 is provided with three liquid crystal panels 25a, 25b, and 25c, three pairs of polarizing filters 25e, 25f, and 25g, disposed on the both sides of the liquid crystal panels 25a, 25b, and 25c, respectively. Here, the liquid crystal panel 25a for the blue light disposed on the first optical path OP1 and the pair of polarizing filters 25e, 25e disposed on the both sides of the liquid crystal panel 25a form a liquid crystal light valve for the blue light for executing the two-dimensional intensity modulation on the blue light out of the intensity-modulated image light in accordance with the image information. Although in these components, the liquid crystal panel 25a is equipped with, for example, a liquid crystal cell performing a homeotropic alignment type of operation, the liquid crystal panel 25a can be arranged to include a liquid crystal cell performing a TN type of operation. The liquid crystal panel 25a has a typical configuration of holding the liquid crystal layer between a pair of substrates, and is provided with an oriented film, a transparent common electrode layer, a black matrix, and so on disposed on the entrance side, namely the front substrate side, and is also provided with an oriented film, a transparent pixel electrode, a circuit layer, and so on disposed on the emission side, namely the rear substrate side. The liquid crystal light valve for blue has an optical compensation element 10 as an optical compensation element for enhancing the contrast incorporated, for example, between the polarizing filter 25e on the emission side and the liquid crystal panel 25a.

Similarly, the liquid crystal panel 25b for the green light and the corresponding polarizing filters 25f, 25f disposed on the second optical path OP2 also form the liquid crystal light valve for the green light, and the liquid crystal panel 25c for the red light and the corresponding polarizing filters 25g, 25g disposed on the third optical path OP3 also form the liquid crystal light valve for the red light. Further, the liquid crystal light valves for the green light and the red light respectively incorporate the optical compensation elements 10 between, for example, the first polarizing filters 25f, 25g and the liquid crystal panels 25b, 25c as the optical compensation elements for improving the contrast.

The blue light, which is transmitted through the first dichroic mirror 23a of the color separation optical system 23 to be branched, enters the first liquid crystal panel 25a for the blue light via the field lens 23f. The green light, which is reflected by the second dichroic mirror 23b of the color separation optical system 23 to be branched, enters the second liquid crystal panel 25b for the green light via the field lens 23g. The red light, which is transmitted through the second dichroic mirror 23b to be branched, enters the third liquid crystal panel 25c for the red light via the field lens 23h. Each of the liquid crystal panels 25a through 25c is a passive type light modulation device for modulating the spatial intensity distribution of the incident illumination light, and the three colors of light entering the respective liquid crystal panels 25a through 25c are modulated in accordance with the drive signals or image signals input to the respective liquid crystal panels 25a through 25c as electric signals. On this occasion, the polarization directions of the illumination light entering the liquid crystal panels 25a through 25c are adjusted by the polarizing filters 25e, 25f, and 25g, and the component light with predetermined polarization direction is taken out from the modulated light emitted from each of the liquid crystal panels 25a through 25c as the image light. Further, the optical compensation elements 10 perform adjustment so that the phase modulation by the liquid crystal panels 25a through 25c becomes appropriate, thus the optical compensation thereof becomes possible.

The cross dichroic prism 27 is a light combining member and has a substantially rectangular planar shape formed of four rectangular prisms bonded with each other, and on the interfaces on which the rectangular prisms are bonded with each other, there is formed a pair of dielectric multilayer films 27a, 27b intersecting with each other forming an X-shape. One of the pair of dielectric multilayer films, the first dielectric multilayer film 27a, reflects the blue light while the other of the pair of dielectric multilayer films, the second dielectric multilayer film 27b, reflects the red light. The cross dichroic prism 27 reflects the blue light from the liquid crystal panel 25a with the first dielectric multilayer film 27a to emit the blue light rightward in the traveling direction, transmits the green light from the liquid crystal panel 25b to emit the green light straight through the first and second dielectric multilayer films 27a, 27b, and reflects the red light from the liquid crystal panel 25c with the second dielectric multilayer film 27b to emit the red light leftward in the traveling direction.

The projection lens 29 projects the color image light combined by the cross dichroic prism 27 on the screen (not shown) with a desired magnification. Therefore, a color movie or a color still image corresponding to the drive signals or the image signals input to the respective liquid crystal panels 25a through 25c is projected on the screen with a desired magnification.

In the projector 110 described above, the optical compensation elements 10 incorporated in the light modulation section 25 are used, as already explained, for the purpose of, for example, fine-tuning the phase modulation amount which the liquid crystal panels 25a through 25c have failed to adjust accurately. By disposing such optical compensation elements 10 in the right places, the contrast in light modulation with the light modulation section 25 can be improved, or efficient and precise control of the light modulation amount becomes possible, thus projection of high quality images becomes possible. On this occasion, the thickness of the optical compensation element 10 and the tilt condition thereof to the optical axis are arranged to correspond to the adjusting amount necessary for the birefringent retardation provided by the liquid crystal panels 25a through 25c. It is preferable that such a thickness and an amount of tilt are set for each of the liquid crystal panels 25a through 25c.

Figure 2:
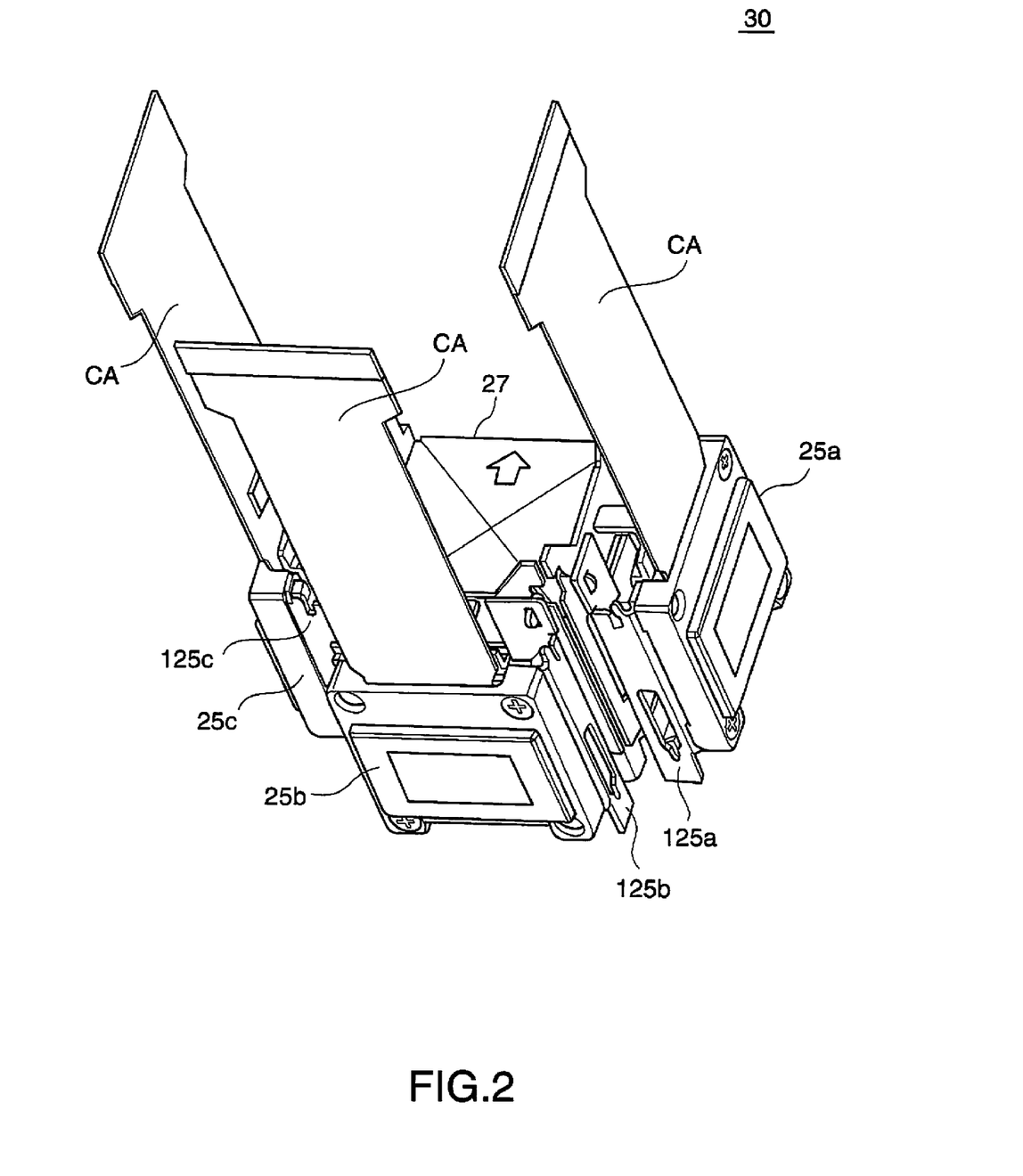
FIG. 2 is a perspective view for explaining the structure of the optical unit as a substantial part of the projector.

FIG. 2 is a perspective view showing a structure of an optical unit forming a part of the projector 110 shown in FIG. 1. The optical unit 30 is provided with a cross dichroic prism 27, the liquid crystal panels 25a, 25b, 25c, and emission filter units 125a, 125b, 125c. Three entrance side surfaces of the cross dichroic prism 27 respectively have the three emission filter units 125a, 125b, 125c attached with alignment thereto, and further, the liquid crystal panels 25a, 25b, 25c fixed thereto in alignment conditions and opposed respectively to the emission filter units 125a, 125b, 125c. In other words, the emission filter units 125a, 125b, 125c are disposed on the emission side of the liquid crystal panels 25a, 25b, 25c, respectively. The emission filter units 125a, 125b, 125c respectively include the polarizing filters 25e, 25f, 25g on the emission side shown in FIG. 1 and the optical compensation elements 10 for respective colors disposed so as to be opposed thereto, and function as a compensation element adjustment mechanisms for individually adjusting the tilted posture of the optical compensation elements 10. It should be noted that a flat type wiring cable CA extends from each of the liquid crystal panels 25a, 25b, 25c.

Figure 3A:
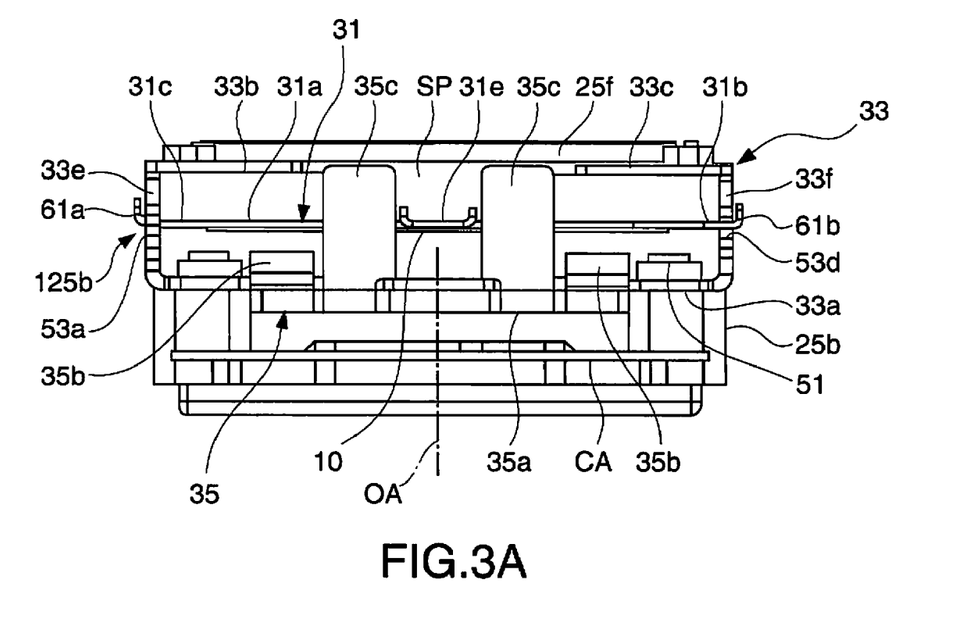
FIGS. 3A and 3B are plan views for specifically explaining a peripheral structure of a specific liquid crystal panel of the optical unit shown in FIG. 2.
Figure 3B:
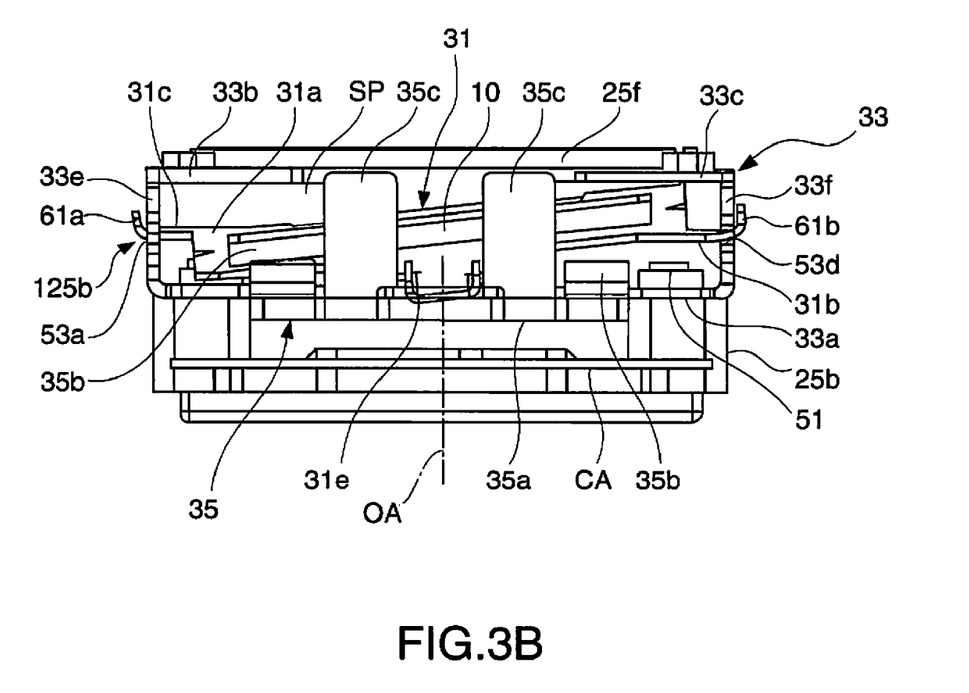
Figure 4A:
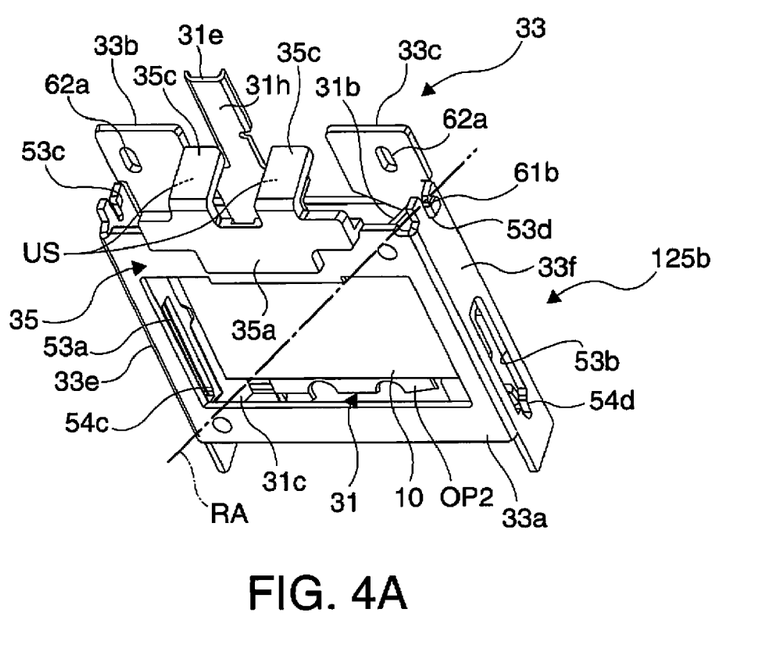
FIG. 4A is a perspective view of the emission filter unit.
Figure 4B:
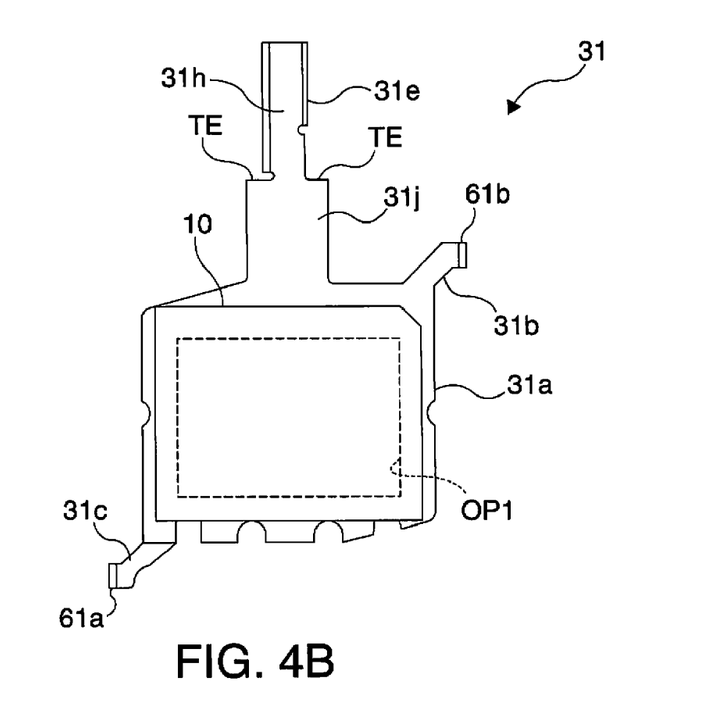
FIG. 4B is a front view of the frame.
Figure 5:
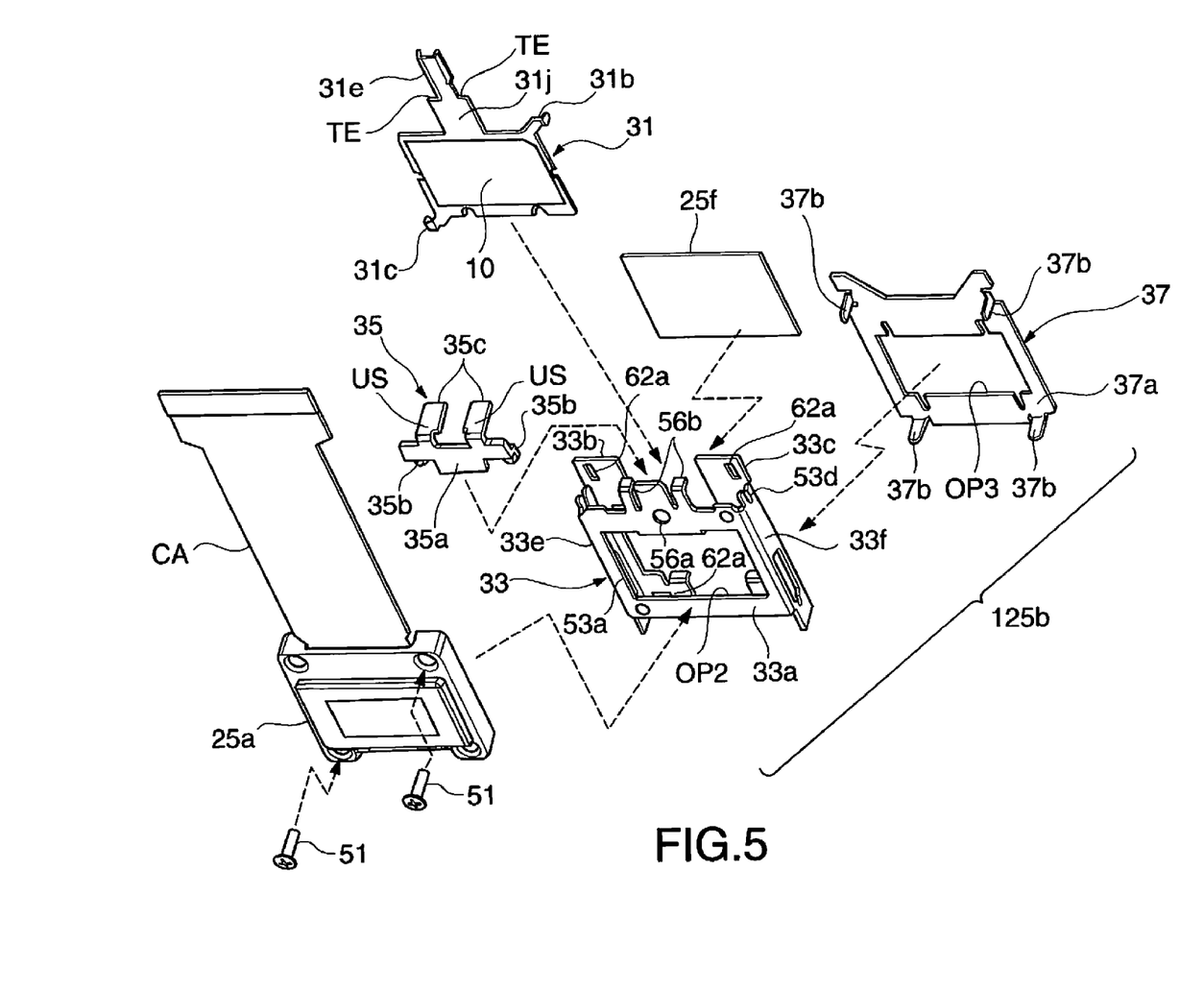

FIGS. 3A and 3B are plan views for specifically explaining a structure of the liquid crystal panel 25b for the green light of the optical unit 30 shown in FIG. 2 and a structure of the peripheral section thereof. Further, FIG. 4A is a perspective view of the emission filter unit 125b, and FIG. 4B is a front view of a frame 31 of the emission filter unit 125b. FIG. 5 is an exploded perspective view of the emission filter unit 125b and so on.

As shown in FIGS. 3A, 5, and soon, the liquid crystal panel 25b is fixed to the emission filter unit 125b with a screw 51. The emission filter unit 125b is provided with the frame 31, a holder member 33, a fixing member 35, and a fixing metal plate 37 in addition to the optical compensation element 10 and the polarizing filter 25f.

In the components described above, the frame 31 is formed by sheet metal processing so as to have a rectangular plate shape, and is provided with a main body section 31a for supporting the optical compensation element 10, a pair of shaft members 31b, 31c disposed at a pair of opposing corners oblique to the field angle of the liquid crystal panel 25b and extending outward, and a lever member 31e extending upward from an upper center. Here, the main body section 31a is provided with a rectangular opening OP1 at the center thereof, and the optical compensation element 10 is attached on a surface thereof near to the liquid crystal panel 25b so as to cover the opening OP1. The pair of shaft members 31b, 31c extending from the main body section 31a is supported by the holder member 33 described later as an elongated plate like member, and allows the main body section 31a to turn around a rotational axis RA perpendicular to the optical axis OA and oblique to the field angle. In other words, the frame 31, namely the optical compensation element 10, is arranged to be able to be tilted at an arbitrary angle within a predetermined range with the liquid crystal panel 25b. A knob 31h provided to the tip of the layer member 31e is used when fine-adjusting the tilt angle of the frame 31 with fingers.

It should be noted that the optical compensation element 10 is formed by attaching a plate like member made of an inorganic or organic material having a birefringent property, a plate like member combining the plate like member made of the inorganic material having the birefringent property and the plate like member made of the organic material having the birefringent property, a WV film, or the like on a transparent plate made of glass or a polymer such as plastic with an adhesive or the like. The optical compensation element 10 can be arranged to have the optical axis in a direction perpendicular to the optical axis OA or a direction parallel to the optical axis OA in accordance with the liquid crystal material encapsulated in the liquid crystal panel 25b or the orientation characteristic of the liquid crystal material. Further, in the case in which the optical axis of the optical compensation element 10 is arranged to be in a direction perpendicular to the optical axis OA, the orientation thereof can be set to have an appropriate angle with the rotational axis RA. It should be noted that as a material of the optical compensation element 10, various materials such as sapphire, quartz crystal, or triacetylcellulose (TAC) can be used.

The holder member 33 has a first junction section 33a on one side to be bonded with the liquid crystal panel 25b, second junction sections 33b, 33c on the other side to which the polarizing filter 25e is attached, and a pair of sidewall sections 33e, 33f for coupling the first junction section 33a and the second junction sections 33b, 33c disposed therebetween.

The holder member 33 is formed by sheet metal processing, and has the junction sections 33a, 33b, 33c and the sidewall sections 33e, 33f formed in three dimensions by folding so as to form a gap-like space SP for housing the frame 31 described above between the first junction section 33a and the second junction sections 33b, 33c. The first junction section 33a is provided with a rectangular opening OP2 formed at the center thereof so that the optical compensation element 10 on the frame 31 and the liquid crystal panel 25b face each other. The both sidewall sections 33e, 33f are provided with insertion holes 53a, 53b formed in lower areas, support notches 53c, 53d as slit-like notches formed in upper areas, and further support notches 54c, 54d as slit-like notches formed at lower ends of the former insertion holes 53a, 53b. The shaft member 31c formed left below the front of the frame 31 shown in FIG. 4A is fitted to the support notch 54c provided to the insertion hole 53a of the one sidewall section 33e with predetermined looseness, and the shaft member 31b formed right above the front of the frame 31 is fitted to the support notch 53d of the other sidewall section 33f with similar looseness. On this occasion, since a clasp section 61a formed at an end section of the shaft member 31c and a clasp section 61b formed at an end section of the shaft member 31b restrict the movement of the frame 31 in cooperation with each other with respect to the lateral direction parallel to the principal surface of the optical compensation element 10, a bumpy movement of the frame 31 in the holder member 33 can be reduced. In other words, the frame 31 becomes capable of smoothly turning around the rotational axis RA in the holder member 33. The polarizing filter 25f is attached to the second junction sections 33b, 33c, which are located across the frame 31 from the first junction section 33a, from the outside, namely from the opposite side to the liquid crystal panel 25b, and is fixed thereto. The second junction sections 33b, 33c are provided with a plurality of mounting holes 62a formed at appropriate positions, thereby making it possible to attach and fix the fixing metal plate 37 shown in FIG. 5.

Figure 6A:
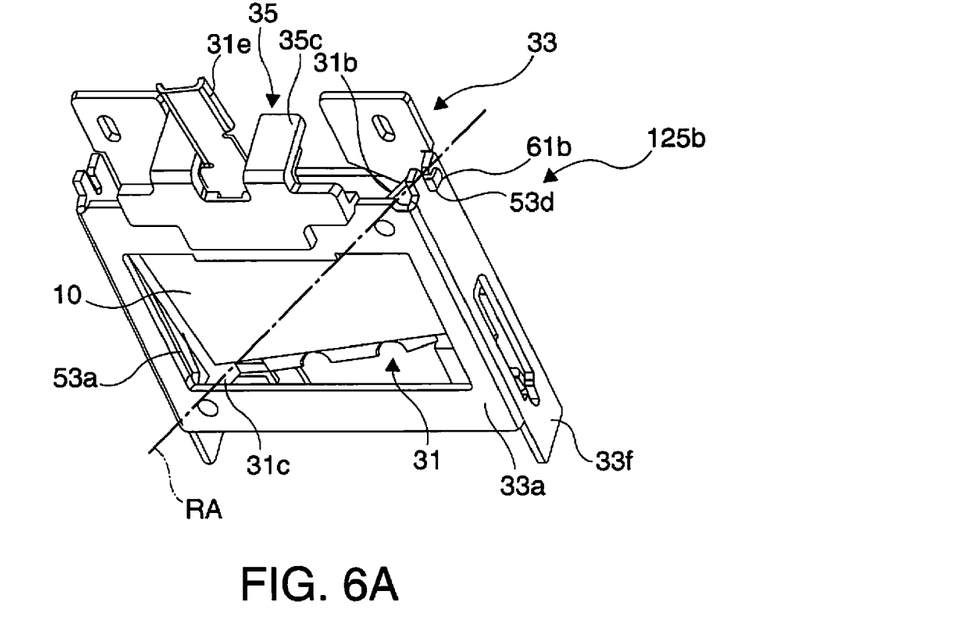
FIGS. 6A and 6B are perspective view and side view each for explaining an operation of the emission filter unit.
Figure 6B:
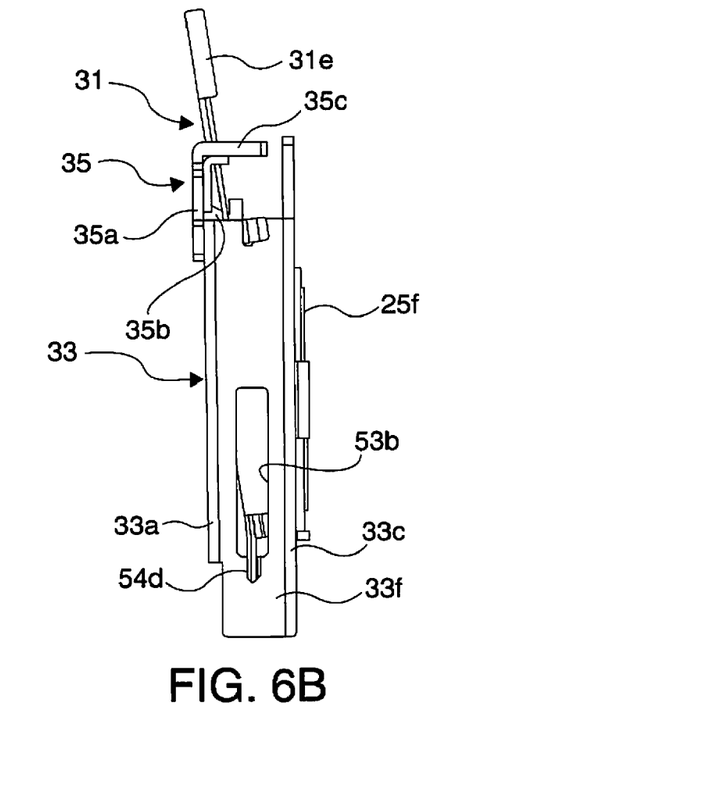

The fixing member 35 is a resin molding, and is provided with a main body section 35a, a pair of clasp sections 35b, 35b, and a pair of protruding sections 35c, 35c. The main body section 35a and the pair of clasp sections 35b, 35b hold the upper end portion of the first junction section 33a of the holder member 33 therebetween in cooperation with each other. Thus, the fixing member 35 is attached to the upper part of the first junction section 33a. On this occasion, a boss-receiving hole 56a of the holder member 33 and a boss (not shown) formed on the rear surface of the main body section 35a are fitted with each other, thus preventing the separation of the fixing member 35. Further, the protrusions 56b provided to the holder member 33 can prevent the fixing member 35 from moving downward excessively. The protruding sections 35c, 35c are spring-like members each functioning as a resin spring, and the undersurfaces US, US of the protruding sections 35c, 35c and the top ends TE, TE of a root section 31j provided to the lever member 31e have elastic contact with each other. Specifically, the undersurfaces US, US of the protruding sections 35c, 35c have contact with the top ends TE, TE of the root section 31j to bias the root section 31j downward. Thus, the displacement of the root section 31j, namely of the frame 31, is prevented by the friction force, and as a result, the frame 31 is prevented from turning around the rotational axis RA. Here, the fixing member 35 as a first member and the lever member 31e as a second member function as a fixing section for preventing the frame 31 from turning. On this occasion, the lever member 31e is held by the pair of protruding sections 35c, 35c serving as rails therebetween on the both sides. Thus, the lever member 31e is guided by the protruding sections 35c, 35c, and thereby the posture of the frame 31 is held stably, and the fine adjustment of the postures of the frame 31 and the optical compensation element 10 becomes possible. Specifically, by pushing the knob 31h of the lever member 31e back and forth (in the direction along the optical axis OA) with fingers, the root section 31j of the lever member 31e slides on the undersurfaces US, US of the protruding sections 35c, 35c against the friction force. It is possible, for example, that the condition parallel to the liquid crystal panel 25b as shown in FIG. 3A is changed to the condition oblique to the liquid crystal panel 25b as shown in FIG. 3B, and it is fixed in such an oblique condition. FIG. 6A is a perspective view for explaining the emission filter unit 125b, on which the adjustment shown in FIG. 3B has been executed, from another viewpoint, and FIG. 6B is a side view for explaining the emission filter unit 125b, on which the adjustment shown in FIG. 3B has been executed, from another viewpoint.

It should be noted that by supplying an adhesive to the root section 31*j* and a space between the protruding sections 35*c*, 35*c* to fix the components after the adjustment shown in FIG. 3B, the frame 31 can surely be fixed, and the positional relationship between the liquid crystal panel 25*b* and the optical compensation element 10 can permanently be fixed.

The fixing metal plate 37 is fixed to the emission side of the holder member 33, and functions as a support holder together with the holder member 33. The fixing metal plate 37 is formed by sheet metal processing, and is provided with a main body section 37*a* having a rectangular plate shape, and claw members 37*b* disposed at four corners of the main body section 37*a* and extending towards the liquid crystal panel 25*b*. The main body section 37*a* has a rectangular opening OP3 at the center thereof, and is arranged so that the polarizing filter 25*f* and the cross dichroic prism 27 shown in FIG. 2 face each other. The fixing metal plate 37 is used for fixing the emission filter unit 125*b* and so on to the cross dichroic prism 27 while maintaining the condition in which the polarizing filter 25*f* and the cross dichroic prism 27 have a necessary distance therebetween. Further, the emission filter unit 125*b* to which the liquid crystal panel 25*b* is fixed is accurately positioned by adjusting the fixing positions of the claw members 37*b* and a plurality of mounting holes 62*a*.

Hereinabove, the structures of the liquid crystal panel 25*b* and the emission filter unit 125*b* for green are explained. The emission filter units 125*a*, 125*c* for respective colors associated with the liquid crystal panels 25*a*, 25*c* for blue and red have substantially the same structure as the structure of the emission filter unit 125*b* described above, and consequently, detailed explanations therefore will be omitted.

Figure 7A:
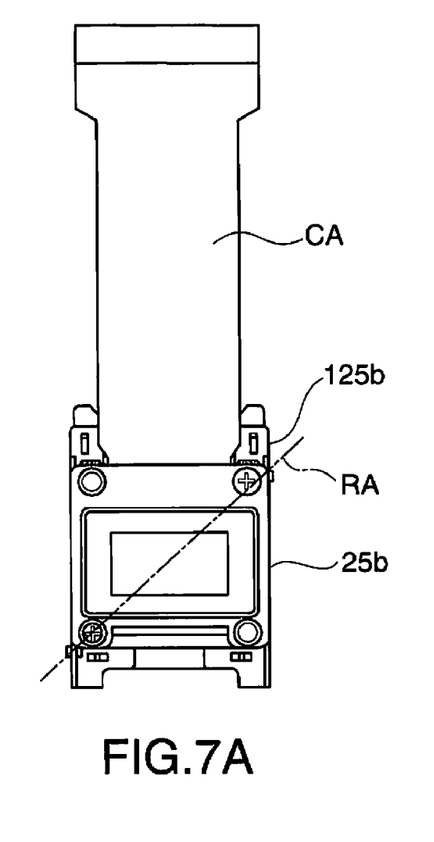
FIGS. 7A and 7C are front views showing two types of liquid crystal panels and emission filter units.
Figure 7B:
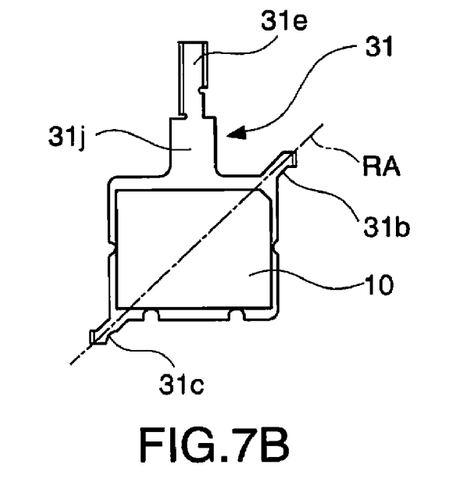
FIGS. 7B and 7D are front views showing two types of frames corresponding respectively to FIGS. 7A and 7C.
Figure 7C:
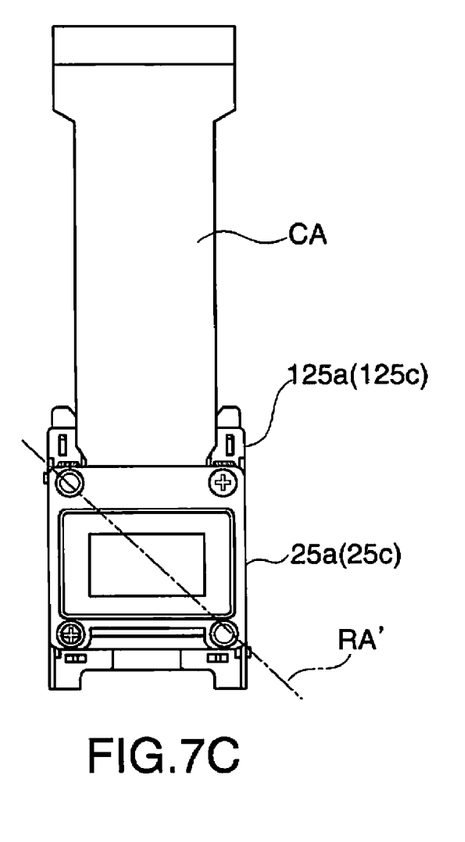
Figure 7D:
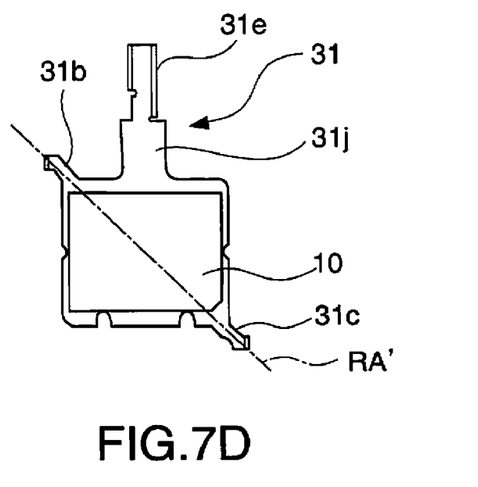

It should be noted that those having pretilt angles reverse to each other are used as the liquid crystal panel 25*b* for green and the liquid crystal panels 25*a*, 25*c* for blue and red, respectively. This is for matching the field angle characteristics by compensating the horizontal reversal when transmitting the light through or reflecting the light at the cross dichroic prism 27, and for this purpose, it is necessary that the optical axis of the optical compensation element 10 and the tilt thereof are reversed horizontally between what is associated with the liquid crystal panel 25*b* for green and what is associated with each of the liquid crystal panels 25*a*, 25*c* for blue and red. FIGS. 7A through 7D are diagrams showing the fact described above. FIG. 7A shows the liquid crystal panel 25*b* for green and the emission filter unit 125*b*, and FIG. 7B shows the frame 31 incorporated in the emission filter unit 125*b*. On the other hand, FIG. 7C shows the liquid crystal panels 25*a*, 25*c* for blue and red and the emission filter units 125*a*, 125*c*, and FIG. 7D shows the frame 31 incorporated in the emission filter units 125*a*, 125*c*. As is clear from the drawings, the frame 31 shown in FIG. 7B and the frame 31 shown in FIG. 7D respectively have mirror reversed shapes. In other words, in the case with the frame 31 shown in FIG. 7D, the shaft member 31*b* extends from the main body section 31*a* to upper left of the front, the shaft member 31*c* extends from the main body 31*a* to lower right of the front, and the lever member 31*e* extends upward from an upper center. As a result, the frame 31 shown in FIG. 7B is arranged to be able to turn around the rotational axis RA tilted up to the right, while the frame 31 shown in FIG. 7D is arranged to be able to turn around the rotational axis RA' tilted up to the left. It should be noted that the holder member 33, the fixing member 35, and the fixing metal plate 37 can be formed as common components to the emission filter units 125*a*, 125*b*, 125*c* described above, and thus achieving cost reduction. Further, the protruding sections of the lever member 31*e* have different lengths from each other, and the tilt direction of the optical compensation element 10 can easily be checked by checking the lever member 31*e* with eyes even after assembling the emission filter unit 125*b*.

As is clear from the explanations described above, in the projector 110 of the present embodiment, the emission filter units 125*a*, 125*b*, 125*c* with a simple structure and the small number of components are provided as the compensation element adjustment mechanisms, wherein the frame 31 for supporting the optical compensation element 10 is provided with the pair of shaft members 31*b*, 31*c* disposed at positions opposed to each other in the periphery of the optical compensation element 10, and the support notches 53*d*, 54*c* provided to the holder member 33 support the both shaft members 31*b*, 31*c*, respectively. Therefore, it becomes possible to adjust the mounting posture of the optical compensation element 10 with respect to each of the liquid crystal panels 25*a*, 25*b*, 25*c* by the adjustment of the position of the frame 31 with respect to the holder member 33. On this occasion, since the fixing member 35 prevents the displacement of the frame 31 with respect to the holder member 33 by the elastic contact, the posture of the optical compensation element 10 can be changed together with the frame 31 and held as it stands, thus it becomes possible to fix the mounting posture of the optical compensation element 10 with relative accuracy and simplicity.

Second Embodiment

A compensation element adjustment mechanism of a second embodiment will hereinafter be explained. It should be noted that the compensation element adjustment mechanism, namely the emission filter unit of the second embodiment is obtained by modifying the emission filter unit 125*b* of the first embodiment shown in FIGS. 3A, 3B and so on, and only different parts will be explained below.

Figure 8A:
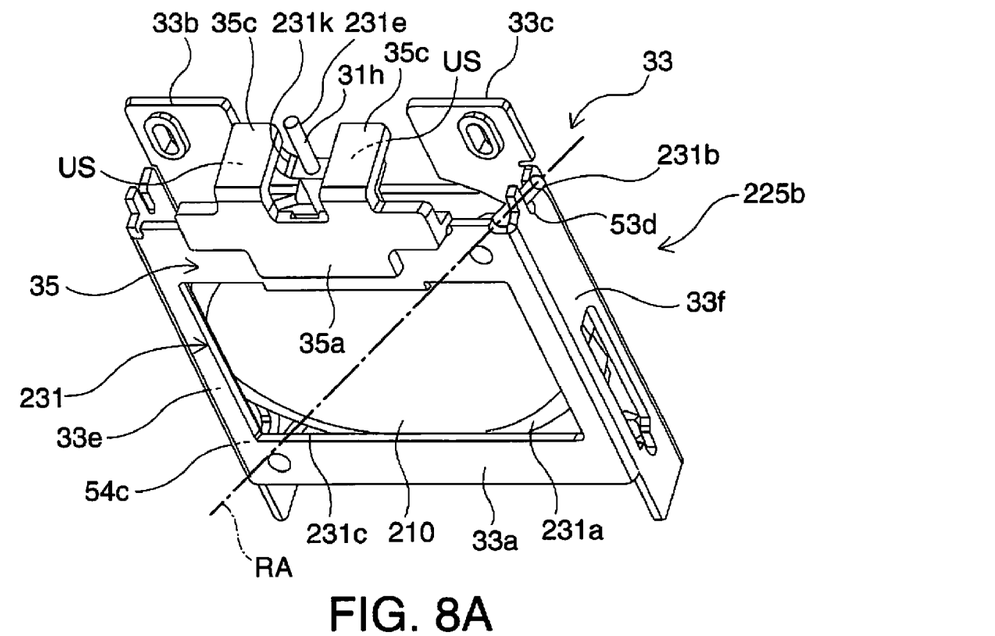
FIG. 8A is a perspective view of the emission filter unit in the second embodiment.
Figure 8B:
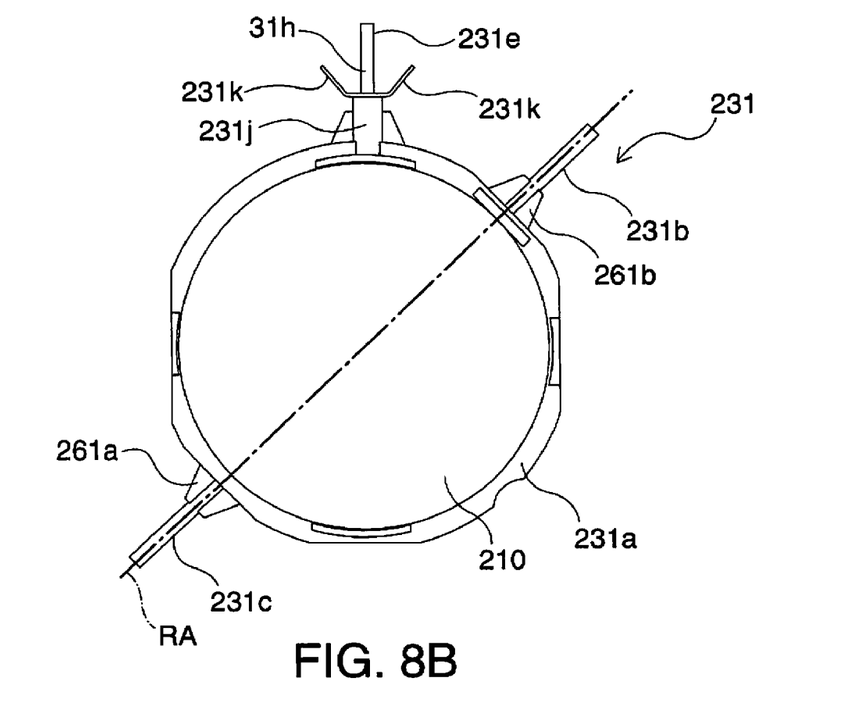
FIG. 8B is a front view of the frame.

FIG. 8A is a perspective view of the emission filter unit 225*b* in the second embodiment, and FIG. 8B is a front view of a frame 231 of the emission filter unit 225*b*.

In this case, the emission filter unit 225*b* is provided with the frame 231 instead of the frame 31 shown in FIG. 4B and so on. The frame 231 has a circular plate shape, and is provided with a main body section 231*a* for supporting the optical compensation element 210, a pair of shaft members 231*b*, 231*c* obliquely extending outward, and a lever member 231*e* extending upward from an upper center thereof. Here, the main body section 231*a* has a circular opening (not shown) at the center thereof, and the optical compensation element 210 is attached thereto so as to cover the opening. The pair of shaft member 231*b*, 231*c* extending from the main body section 231*a* is supported by the support notches 53*d*, 54*c* of the holder member 33 as rod-like members, and allows the main body section 231*a* to turn around the rotational axis RA. In other words, the frame 231, namely the optical compensation element 210, is arranged to be able to be tilted at an arbitrary angle within a predetermined range with the liquid crystal panel 25*b* shown in FIGS. 2 and so on. On this occasion, since a restriction member 261*a* formed at a root section of the shaft member 231*c* and a restriction member 261*b* formed at an end section of the shaft member 231*b* restrict the movement of the frame 231 in cooperation with each other with respect to the lateral direction parallel to the principal surface of the optical compensation element 210, a bumpy movement of the frame 231 in the holder member 33 can be reduced. In other words, the frame 231 becomes capable of smoothly turning around the rotational axis RA in the holder member 33. It should be noted that the optical compensation element 210 has a circular contour, but has substantially the same function as the optical compensation element 10 shown in FIG. 4B and so on.

Figure 9A:
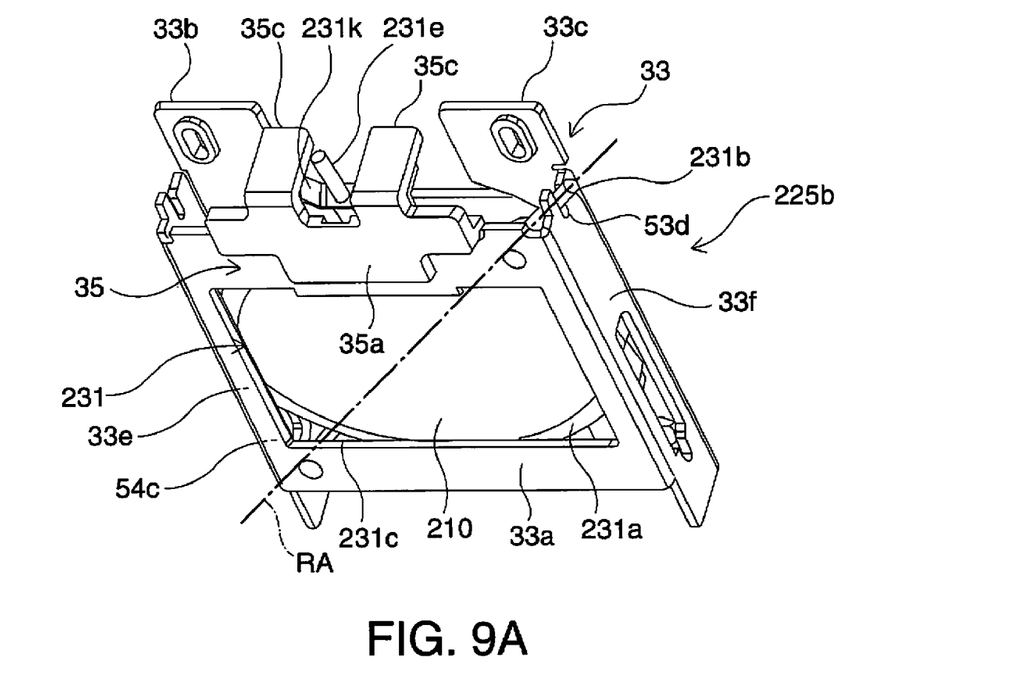
FIGS. 9A and 9B are perspective view and side view each for explaining an operation of the emission filter unit.
Figure 9B:
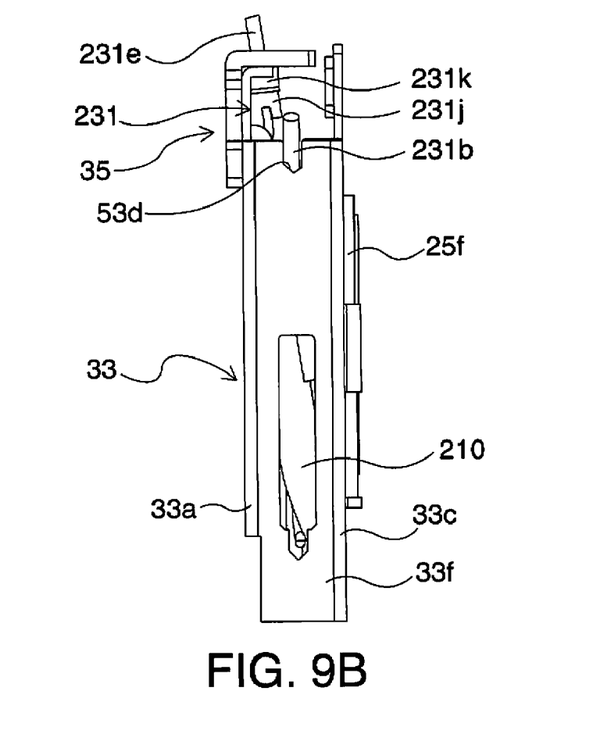

The knob 31h provided to the tip of the layer member 231e is used when fine-adjusting the tilt angle of the frame 231 with fingers. A pair of plate springs 231k, 231k extends from the root section 231j of the lever member 231e. Upper ends of the both plate springs 231k, 231k and the undersurfaces US, US of the protruding sections 35c, 35c provided to the fixing member 35 fixed to the upper part of the holder member 33 have elastic contact with each other. Thus, the displacement of the root section 231j, namely of the frame 231, is prevented, and as a result, the frame 231 is prevented from turning around the rotational axis RA. In other words, the posture of the frame 231 is held stably, and the fine adjustment of the postures of the frame 231 and the optical compensation element 210 becomes possible by means of the plate springs 231k, 231k, and so on. Specifically, by pushing the layer member 231e back and forth with fingers, it is possible, for example, that the condition parallel to the liquid crystal panel 25b as shown in FIG. 8A is changed to the condition oblique to the liquid crystal panel 25b as shown in FIG. 9A, and it is fixed in such an oblique condition. Here, the fixing member 35 as a first member and the lever member 231e as a second member function as a fixing section for preventing the frame 231 from turning. It should be noted that FIG. 9B is a side view for explaining the emission filter unit 225b shown in FIG. 9A from another viewpoint.

Third Embodiment

A compensation element adjustment mechanism of a third embodiment will hereinafter be explained. It should be noted that the compensation element adjustment mechanism, namely the emission filter unit of the third embodiment is obtained by modifying the emission filter unit 125b of the first embodiment shown in FIGS. 3A, 3B and so on, and only different parts will be explained below.

Figure 10A:
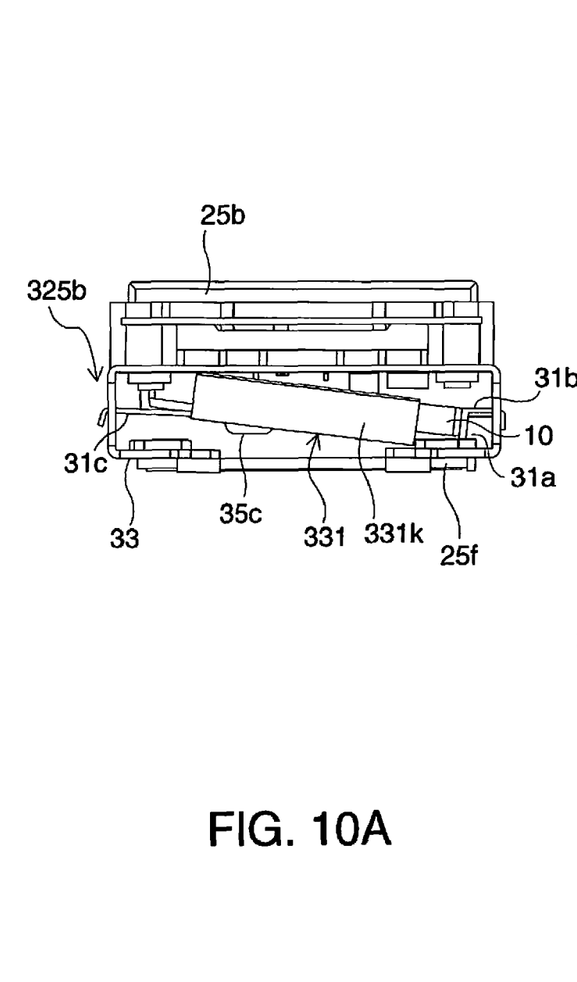
FIG. 10A is a plan view for explaining the peripheral structure of the liquid crystal panel in the third embodiment.
Figure 10B:
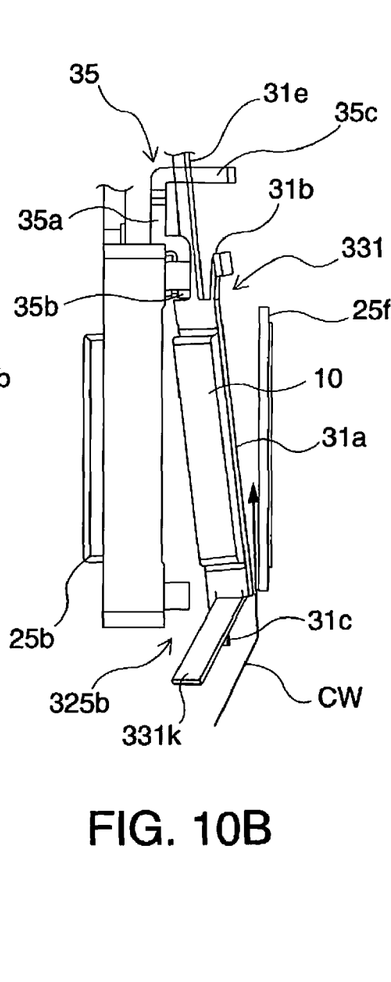
FIGS. 10B and 10C are side views for explaining an operation of the emission filter unit.
Figure 10C:
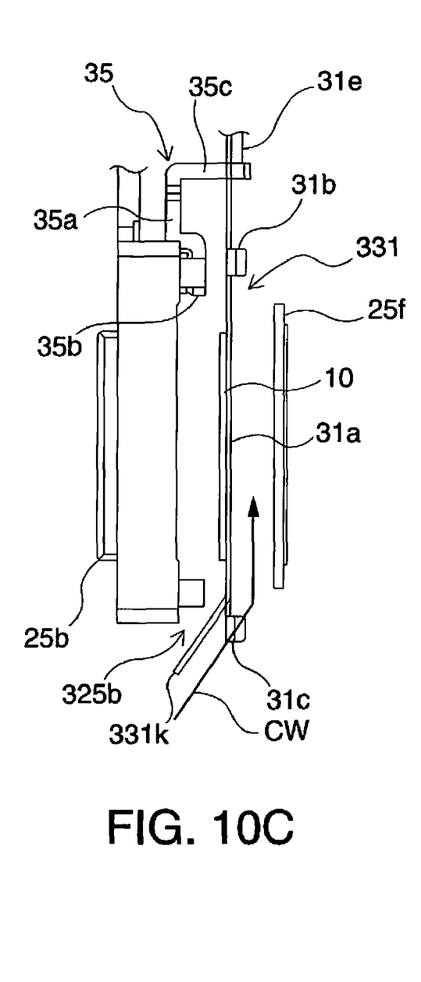

FIGS. 10A through 10C are diagrams for explaining an emission filter unit 325b and so on of the third embodiment, wherein FIG. 10A is a bottom view of the emission filter unit 325b, and FIGS. 10B and 10C are side views for explaining an arrangement of a frame 331 forming the emission filter unit 325b shown in FIG. 10A.

In this case, a current plate 331k is disposed at a lower end of the frame 331. The emission filter unit 325b is cooled by a cooling airflow CW supplied from an air-cooling device, not shown, and the cooling airflow CW flows from the lower side to the upper side. Here, in the case in which the optical compensation element 10 and the polarizing filter 25f are arranged in parallel to each other as shown in FIG. 10C, the cooling airflow CW passes through the space between the optical compensation element 10 and the polarizing filter 25f without substantial turbulence to efficiently cool the polarizing filter 25f. On the other hand, in the case in which the optical compensation element 10 is tilted to make the lower end of the optical compensation element 10 and the lower end of the polarizing filter 25f come close to each other as shown in FIG. 10B, it becomes difficult for the cooling airflow CW to pass through the space between the optical compensation element 10 and the polarizing filter 25f. However, since the current plate 331k has a function of collecting the cooling airflow CW to flow into the space between the lower end of the optical compensation element 10 and the lower end of the polarizing filter 25f, the cooling efficiency of the polarizing filter 25f can be maintained, thereby preventing the polarizing filter 25f from heating.

Although the invention is explained hereinabove along the embodiments, the invention is not limited to the above embodiments. For example, although the optical compensation elements 10 for improving the contrast are incorporated between, for example, the polarizing filters 25e, 25f, 25g on the emission side and the liquid crystal panels 25a, 25b, 25c in the embodiments described above, it is possible to incorporate the optical compensation elements 10 between the polarizing filters 25e, 25f, 25g on the entrance side and the liquid crystal panels 25a, 25b, 25c. In this case, an entrance filter units having substantially the same structures as the emission filter units 125a, 125b, 125c shown in FIGS. 2 and so on, on the entrance sides of the liquid crystal panels 25a, 25b, 25c, respectively.

Further, although the rotational axis RA on which the frames 31, 231, 331 are rotated is arranged in the direction 45 degree tilted from the vertical direction and the horizontal direction of the screen of the liquid crystal panels 25a, 25b, 25c, in the embodiments described above, the angle of the rotational axis RA can be set in a plane perpendicular to the optical axis OA.

Further, although in the projector 110 of the embodiments described above, the light source device 21 is composed of the light source lamp 21a, the pair of fly-eye lenses 21d, 21e, the polarization conversion member 21g, and the overlapping lens 21i, the fly-eye lenses 21d, 21e and the polarization conversion member 21g and so on can be eliminated, and the light source lamp 21a can be replaced with another light source such as an LED.

Further, although in the embodiments described above, the color separation of the illumination light is performed using the color separation optical system 23, and after the modulation of each color is performed in the light modulation section 25, the combination of the images of the respective colors is performed in the cross dichroic prism 27, it is also possible to form an image by a single liquid crystal panel, namely the liquid crystal light valve.

Further, although the liquid crystal panels 25a, 25b, 25c for the blue light, the green light, and the red light are disposed respectively on the light paths OP1, OP2, OP3 in the embodiments described above, it is also possible to exchange the liquid crystal panels disposed on the light paths.

Although in the embodiments described above, only the example of the projector 110 using three liquid crystal panels 25a through 25c, the invention can be applied to a projector using two liquid crystal panels or a projector using four or more liquid crystal panels.

Further, the liquid crystal panels 25a through 25c are not limited to the transmissive types, but can be the reflective types. In this case, since a single polarization plate is disposed only on one side of each of the liquid crystal panels 25a through 25c, it is possible that a type of emission filter unit in which the optical compensation element 10 is disposed between each of the liquid crystal panels 25a through 25c and the single polarization plate is disposed on the front of each of the liquid crystal panels 25a through 25c.

Although in the embodiments, only an example of the front type of projector for performing projection from the direction in which the screen is observed is cited, the invention can be applied to rear projectors for performing projection from the direction opposite to the direction in which the screen is observed.

The entire disclosure of Japanese Patent Application No. 2007-203868, filed Aug. 6, 2007 is expressly incorporated by reference herein.

What is claimed is:

1. A compensation element adjustment mechanism comprising:
    an optical compensation element disposed between a light modulation device and a polarization plate;
    a frame for supporting the optical compensation element, and having a pair of shaft members disposed at positions opposed to each other on a periphery of the optical compensation element;
    a support holder to be fixed with respect to the light modulation device, and for rotatably supporting the pair of shaft members; and
    a fixing section for restricting a displacement of the frame to the support holder by an elastic contact,
    wherein:
        the fixing section includes a first member attached to the support holder and a second member extending from the frame, and restricts the displacement of the frame to the support holder by an elastic contact between the first and second members, and
        the fixing section includes any one of a resin spring and a metal plate spring provided to any one of the first member and the second member.

2. The compensation element adjustment mechanism according to claim 1,
    wherein the fixing section allows a fine adjustment of the displacement of the frame with respect to the support holder by stopping the frame with friction force.

3. The compensation element adjustment mechanism according to claim 1,
    wherein the second member extends outside the support holder to have an operating knob allowing adjustment of a posture of the frame.

4. The compensation element adjustment mechanism according to claim 1,
    wherein a pair of shaft members is disposed in a direction tilted from a vertical direction and a horizontal direction of a screen of the light modulation device.

5. The compensation element adjustment mechanism according to claim 1,
    wherein the pair of shaft members is any one of a rod-like member and an elongated member respectively supported by a pair of slit-like notches provided to the support holder.

6. The compensation element adjustment mechanism according to claim 1,
    wherein the support holder includes
        a first junction section to be bonded with the light modulation device on one side of the support holder;
        a second junction section, to which the polarization plate is to be attached, on the other side of the support holder; and
        a gap-like space for housing the frame between the first junction section and the second junction section.

7. The compensation element adjustment mechanism according to claim 1,
    wherein the support holder further includes
        a fixing metal plate disposed on an emission side of the polarization plate disposed on an emission side of the light modulation device.

8. A projector comprising:
    the compensation element adjustment mechanism according to claim 1 provided for each of colors;
    the light modulation device provided for each of the colors;
    an illumination device for illuminating the light modulating devices for the respective colors;
    a light combining device for combining the light emitted from the light modulating devices for the respective colors; and
    a projection optical system for projecting the light combined through the light combining device.

9. The projector according to claim 8,
    wherein the fixing section allows a fine adjustment of the displacement of the frame with respect to the support holder by stopping the frame with friction force.

10. The projector according to claim 8,
    wherein the second member extends outside the support holder to have an operating knob allowing adjustment of a posture of the frame.

11. The projector according to claim 8,
    wherein a pair of shaft members is disposed in a direction tilted from a vertical direction and a horizontal direction of a screen of the light modulation device.

12. The projector according to claim 8,
    wherein the pair of shaft members is any one of a rod-like member and an elongated member respectively supported by a pair of slit-like notches provided to the support holder.

13. The projector according to claim 8,
    wherein the support holder includes
        a first junction section to be bonded with the light modulation device on one side of the support holder;
        a second junction section, to which the polarization plate is to be attached, on the other side of the support holder; and
        a gap-like space for housing the frame between the first junction section and the second junction section.

14. The projector according to claim 8,
    wherein the polarization plate is disposed on an emission side of the light modulation device, and
    the support holder further including
        a fixing metal plate disposed on an emission side of the polarization plate.

* * * * *